US011982322B2

(12) United States Patent
Gebhart et al.

(10) Patent No.: US 11,982,322 B2
(45) Date of Patent: May 14, 2024

(54) CONE FRICTION CLUTCH HAVING AN ACTUATOR AND A LEVER FOR DISENGAGING THE CLUTCH

(71) Applicant: KENDRION (MARKDORF) GMBH, Markdorf (DE)

(72) Inventors: Manfred Gebhart, Constance (DE); Martin Baschnagel, Berg (DE); Dirk Hartmann, Ravensburg (DE); Alkan Ince, Friedrichshafen (DE); Christian Grosser, Balingen (DE); Björn Bergfeld, Balingen (DE)

(73) Assignee: KENDRION (MARKDORF) GMBH, Markdorf (DE)

( * ) Notice: Subject to any disclaimer, the term of this patent is extended or adjusted under 35 U.S.C. 154(b) by 0 days.

(21) Appl. No.: 18/011,002

(22) PCT Filed: Jul. 17, 2020

(86) PCT No.: PCT/EP2020/070312
§ 371 (c)(1),
(2) Date: Dec. 16, 2022

(87) PCT Pub. No.: WO2021/254644
PCT Pub. Date: Dec. 23, 2021

(65) Prior Publication Data
US 2023/0235796 A1 Jul. 27, 2023

(30) Foreign Application Priority Data
Jun. 17, 2020 (DE) .......................... 102020115940.4

(51) Int. Cl.
*F16D 25/0632* (2006.01)
*F16D 23/12* (2006.01)
*F16D 25/12* (2006.01)

(52) U.S. Cl.
CPC ....... *F16D 25/0632* (2013.01); *F16D 25/126* (2013.01); *F16D 2023/126* (2013.01)

(58) Field of Classification Search
CPC ............... F16D 13/24–36; F16D 13/66; F16D 2023/126; F16D 25/126; F16D 25/0632; F16D 27/11; F16D 43/218
See application file for complete search history.

(56) References Cited

U.S. PATENT DOCUMENTS 1,215,779 A * 2/1917 Conklin .................. F16D 13/26
192/89.27
2,090,411 A 8/1937 Eason
(Continued)

FOREIGN PATENT DOCUMENTS

DE 102007058513 A1 7/2008
DE 102007021791 A1 3/2009
(Continued)

*Primary Examiner* — David R Morris
*Assistant Examiner* — James J Taylor, II
(74) *Attorney, Agent, or Firm* — Nath, Goldberg & Meyer; Jerald L. Meyer

(57) ABSTRACT

A friction surface clutch (10) for use in motor vehicles is provided. The friction surface clutch includes a first tapered element having a first friction surface and a second tapered element having a second friction surface, along with an actuating device having an actuating element for force-locked connection and disconnection of the tapered elements. The actuating device includes a pressure element coupled to the actuating element and a lever device interacting with the first tapered element. The first tapered element has a guide part in which the pressure element can be guided in a torsion-resistant way relative to the first tapered element prior to reaching a wear limit of the friction surfaces and can be engaged with the lever device to disconnect the force-locked connection. The pressure ele-
(Continued)

ment can be detached from the guide part when the wear limit of the friction surfaces is reached.

20 Claims, 9 Drawing Sheets

(56) References Cited

U.S. PATENT DOCUMENTS

| | | | | |
|---|---|---|---|---|
| 8,360,219 B2* | 1/2013 | Swanson | ............ | F16D 25/0632 |
| | | | | 192/114 R |
| 11,739,799 B2* | 8/2023 | Bergfeld | ................ | F16D 23/12 |
| | | | | 192/66.2 |

FOREIGN PATENT DOCUMENTS

| | | | |
|---|---|---|---|
| DE | 102019101760 B3 | 6/2020 | |
| EP | 0321873 A2 | 6/1989 | |
| FR | 460329 | 11/1913 | |

* cited by examiner

CONE FRICTION CLUTCH HAVING AN ACTUATOR AND A LEVER FOR DISENGAGING THE CLUTCH

This is a National Phase Application filed under 35 U.S.C. 371 as a national stage of PCT/EP2020/070312, filed Jul. 17, 2020, an application claiming the benefit of German Application No. 10 2020 115 940.4 filed Jun. 17, 2020, the content of each of which is hereby incorporated by reference in its entirety.

The invention relates to a friction surface clutch and a method for actuating a friction surface clutch for use in motor vehicles, in particular for switching an air compressor or the like, wherein the friction surface clutch comprises a first tapered element having a first friction surface and a second tapered element having a second friction surface, wherein the friction surface clutch has an actuating device having an actuating element for force-locked connection and disconnection of the tapered elements, wherein the tapered elements are in force-locked connection in an unactuated operating state of the friction surface clutch.

The aforementioned friction surface clutches are known from prior art and are commonly used in motor vehicles, in particular for switching an air compressor or the like on and off.

For example, a friction surface clutch is known from DE 10 2007 021 791 A1, in particular for use in motor vehicles, for example for switching an air compressor, in which at least two friction surfaces can be frictionally fitted, and in which two tapered friction surface pairs are provided.

Such friction surface clutches, which are also referred to as tapered friction surface clutches, always have a first tapered element having a first friction surface and a second tapered element having a second friction surface, wherein the tapered elements or the friction surfaces can be connected and disconnected by force locking. Compared to conventional multi-surface friction disk clutches the tapered friction surface clutch has the advantage that the same can transmit higher torque with a comparatively small structural volume of the clutch. In addition, such friction surface clutches typically include an actuating device having an actuating element for a force-locked connection and disconnection of the tapered elements. The actuating element may herein, for example, be configured as a piston actuated by compressed air, which may be pressed against the first tapered element such that the first tapered element and the second tapered element are connected through force locking or disconnected from the same. In addition, it may be the case that the tapered elements are force-locked in an unactuated operating state of the friction surface clutch. This is particularly advantageous in cases where the actuating device is defective, since the friction surface clutch is thus able to maintain operation despite the defect. For example, it is feasible that the actuating device can be actuated electromagnetically. If the actuating device is now no longer supplied with electrical energy due to a defect, the same can no longer be actuated. Despite this the tapered elements are engaged in a force-locked manner such that the friction surface clutch or an air compressor or other auxiliary equipment switched by means of the friction surface clutch can be maintained (fail-safe feature).

When connecting and disconnecting the tapered elements or friction surfaces, the friction surfaces are in particular subject to progressive wear such that the tapered elements are no longer in a force-locked connection in the unactuated operating state of the friction surface clutch when the wear limit of the friction surfaces is reached. This inevitably leads to the switching off of auxiliary equipment such as an air compressor switched by the friction surface clutch. If the air compressor is now for example provided for supplying compressed air to the pneumatic braking system of a heavy-duty vehicle, this may cause the braking system to fail, which may not least have serious consequences for the driver of the heavy-duty vehicle. For this reason, it is desirable to provide a friction surface clutch of the type described above, where in particular the disconnection of the tapered element upon reaching the wear limit of the friction surfaces is reliably avoided.

Thus, it is known from prior art that wear of the friction surfaces is for example monitored by means of a sensor and the actuating device is deactivated shortly before the wear limit of the friction surfaces is reached, so that the force-locked connection can no longer be disconnected. This ensures that further wear of the friction surfaces is prevented and that the tapered elements or the friction surfaces can remain friction-locked until the friction surface clutch is replaced. However, this type of friction surface clutch can only be very expensively manufactured and operated, in particular if additional maintenance effort of such a friction surface clutch is required in order to ensure reliable monitoring of the friction surfaces by means of a sensor. Last but not least, the manufacture and operation of such friction surface clutches are costly.

In addition, a friction surface clutch of the type described above is known from German patent application 10 2019 101 760.2 by the same applicant, which has not been disclosed on the priority date of this patent application, where the actuating device has a pressure ring coupled to an operating element and three clutch release levers connected to a first tapered element, wherein the pressure ring can be moved relative to the clutch release levers in an unactuated operating state of the friction surface clutch, wherein the pressure ring can be pressed onto the clutch release levers in an operating state of the friction surface clutch in such a way that a force-locked connection can be disconnected, wherein, when the friction surface clutch is actuated, the pressure ring and the clutch release levers can be continuously shortened by wear in such a way that, when a wear limit of the pressure ring and the clutch release levers is reached, the pressure ring and the clutch release levers can no longer be contacted, so that the force-locked connection can no longer be disconnected. However, it has proved disadvantageous here that the three clutch release levers are not necessarily shortened at the same time, so that the pressure ring and the clutch release levers can no longer be contacted. Therefore, it is not impossible for the pressure ring to get stuck on the clutch release levers.

Accordingly, it is the object of the present invention to provide a friction surface clutch, a motor vehicle having a friction surface clutch and a method for actuating a friction surface clutch for use in motor vehicles, in particular for switching an air compressor or the like, which enable a more reliable operation of the friction surface clutch or the air compressor.

This object is achieved by a friction surface clutch having the features of claim 1, a motor vehicle having a friction surface clutch having the features of claim 19 and a method for actuating a friction surface clutch having the features of claim 20.

The friction surface clutch according to the invention for use in motor vehicles, in particular for switching an air compressor or the like, comprises a first tapered element having a first friction surface and a second tapered element having a second friction surface, wherein the friction surface clutch has an actuating device having an actuating element for the forced-locked connection and disconnection of the tapered elements, wherein the tapered elements are in force-locked connection in an unactuated operating state of the friction surface clutch, wherein the actuating device has a pressure element coupled to the actuating element and a lever device interacting with the first tapered element, wherein the pressure element can be engaged with the lever device in an operating state of the friction surface clutch, wherein the force-locked connection is disconnectable, wherein the first tapered element has a guide part, in which the pressure element can be guided in a torsional locking manner relative to the first tapered element before reaching a wear limit of the friction surface and is capable of engaging with the lever device in order to disconnect the force-locked connection, wherein the pressure element can be detached from the guide part when the wear limit of the friction surfaces is reached such that the pressure element can no longer engage with the lever device after leaving the guide part and can no longer disconnect the force-locked connection.

Therefore, the actuating element is not directly pressed against the first tapered element when actuating the friction surface clutch, but the actuating device has a pressure element coupled to the actuating element and a lever device interacting with the first tapered element, wherein the pressure element can be engaged with the lever device in an actuated operating state of the friction surface clutch in such a way that the force-locked connection can be disconnected. In the unactuated operating state of the friction surface clutch, the tapered elements or the friction surfaces are in a force-locked connection. If torque is now transmitted by means of the friction surface clutch the tapered elements perform a rotational movement. In this case, the lever device may be connected to the first tapered element so that the lever device may participate in the rotational movement. The pressure element may further be rotationally synchronized with the first tapered element, for example by a form-fitting connection between the pressure element and the first tapered element. Thus, the pressure element can also participate in the rotational movement. The actuating element may, however, be constructed or arranged in a way that it does not participate in the rotational movement. If the friction surface clutch is now actuated, the pressure element engages with the lever device or is pressed onto the lever device. This causes a displacement or inclination of the lever device and the first tapered element interacting with the lever device, thereby disconnecting the force-locked connection.

When actuating the friction surface clutch, the friction surfaces continuously wear in such a way that the pressure element, when reaching a wear limit of the friction surfaces, can be detached from a guide part of the first tapered element, in which the pressure element can be guided in a torsional locking manner relative to the first tapered element before reaching the wear limit of the friction surfaces, and is capable of engaging with the lever device in order to disconnect the force-locked connection, such that the pressure element can no longer be engaged with the lever device after leaving the guide part. Therefore, the force-locked connection can no longer be disconnected when the wear limit is reached. It is important here to reach the wear limit earlier than the critical wear limit of the friction surfaces, where the friction surfaces are worn in such a way that the friction surfaces are no longer in a force-locked connection even in the unactuated operating state. Therefore, a failure of the friction surface clutch due to wear of the friction surfaces can be reliably avoided. An air compressor switched in particular by means of the friction surface clutch and provided for supplying power to a pneumatic braking system of a motor vehicle can thus maintain operation in such a way that the motor vehicle can continue to run safely until the friction surface clutch is replaced. Last but not least the manufacture and operation of the friction surface clutch according to the invention has proved to be extremely cost-effective.

Advantageously, a pressure ring can be provided as a pressure element and the lever device may comprise at least two, preferably three clutch release levers, wherein the pressure element may comprise a main body and a number of pressure sections corresponding to a number of clutch release levers, which sections are constructed as circular protrusions projecting from the main body in an axial direction, wherein the pressure element can be engaged with the clutch release levers via the pressure sections. In this case, the pressure ring can be uniformly engaged with the lever device or pressed against the lever device The clutch release levers can preferably be arranged at uniform intervals around a rotation axis of the first tapered element and are in form-fitting connection with the first tapered element using a radial inner side of the clutch release levers. Thus, the pressure ring can be axially moved with respect to a rotation axis of the first tapered element and presses radially outwardly on an axial side of the clutch release levers as far as possible via the pressure sections, so that the clutch release levers can perform a tilting movement. The axial side can be inclined in the radial interior against a direction of movement of the pressure ring here in such a way that the first tapered element can be displaced against the direction of movement of the pressure ring, thereby allowing the force-locked connection between the tapered elements to be disconnected. The pressure element or the main body can expediently form the pressure sections.

In a preferred embodiment of the friction surface clutch the first tapered element can have a number of passages corresponding to the number of pressure sections and at least contributing toward forming the guide part, in which the pressure sections can be at least partially engaged with the passage in the unactuated operating state before reaching the wear limit of the friction surfaces, so that the pressure sections can be held in the passages with respect to the first tapered element in a torsion-resistant way, wherein the pressure sections can pass through the passages in the actuated operating state in such a way that the pressure sections can engage with the clutch release levers arranged behind the passages as viewed in the axial direction.

In a structurally advantageous embodiment of the invention, the first tapered element can move away from the pressure element in an axial direction while the friction surfaces continue to wear, so that the pressure sections can no longer engage with the passages in the unactuated operating state when the wear limit of the friction surfaces is reached, whereby the pressure sections can be detached from the guide part away from the guide part.

According to the development, the pressure sections may be rotated at an angle of rotation relative to the first tapered element after leaving the guide part, so that the pressure sections are no longer able to press against the inner surface of the first tapered element at least partially in alignment with the passages in the actuated operating state. In particular, due to rotational acceleration, which can in particular be applied to the pressure element whilst the friction surface clutch is actuated, the pressure sections are then able to rotate relative to the passages to such an extent that the pressure sections are no longer aligned with the passages, so that the pressure sections are no longer engaged with or pass through the passages when actuating the friction surface clutch, but instead press at least partly on an inner surface of the first tapered element or come to lie against the same. Since the pressure sections are no longer pressed against the lever device, but against the inner surface, the force-locked connection is no longer disconnectable. Instead, the force-locked connection between the tapered elements, and therefore a torque transmitted between the tapered elements is increased upon renewed actuation of the friction surface clutch upon reaching the wear limit, as the tapered elements are pressed against each other during this actuation. The rotation angle may be related to a rotation axis of the first tapered element as the axis of rotation.

Advantageously, the first tapered element can have a stop limiting the rotation angle and/or at least one receiving recess in which at least one of the pressure sections can be arrested after completely leaving the guide part. This can be avoided by means of a stop, so that the pressure sections can snap into passages adjacent to these passages after leaving the passages, so that the force-locked connection may be disconnected again. The receiving recess guarantees that at least one of the pressure sections can be held in the receiving recess in a torsion-resistant way after being arrested in the receiving recess. As a result, the disconnecting of the force-locked connection is no longer possible. Advantageously, each pressure section is provided with a receiving recess. The receiving recess can form the stop. For example, the receiving recess may be constructed in the form of a recess.

Preferably, the actuating element can be actuated pneumatically, hydraulically or electromagnetically. Particularly preferably, the actuating element can be actuated pneumatically. In the unactuated operating state of the friction surface clutch the actuating element is then not subjected to pressure. The compressed air required for actuating the friction surface clutch can also be generated directly by the air compressor, wherein it is feasible that the air compressor fills a storage container with compressed air, which can be provided for supplying a pneumatic braking system of a motor vehicle.

According to one expedient construction of the present invention the actuating element can be constructed as a piston. The piston can then be displaceably supported relative to a housing of the friction surface clutch inactively and parallel to a rotation axis of the tapered elements in a receiving space of said housing of the friction surface clutch. In addition, the pressure element can rotate relative to the piston.

In an advantageous variant of the invention the actuating element may be designed to be spring-resettable. The actuating device can consequently have a spring that holds the actuating element in a starting position in the unactuated operating state of the friction surface clutch or returns the same from an end position to the starting position when transitioning from the actuated operating state to the unactuated operating state.

In a particular development of the invention, the actuating device can have a spring means, preferably a disk spring, particularly preferably two disk springs alternately layered with each other, by means of which the tapered elements can be pressed together in a force-locked way in the unactuated operating state of the friction surface clutch. The spring means can be connected to the first tapered element so that the same can participate in a rotational movement of the first tapered element. When the friction surface clutch is actuated the lever device interacting with the first tapered element can press the first tapered element against the spring means, wherein the force-locked connection can be disconnected. It may also be the case that the lever device presses against the spring means. Optionally, the lever element may be arranged between the lever device and the spring means. Advantageously, the friction surfaces can then be constructed in such a way that their wear limit is reached relatively faster than a wear limit of the spring means. Undesired disconnection of the tapered elements due to wear of the spring means in the unactuated operating state can thus be avoided.

Advantageously, the first tapered element can be form-fittingly connected to a hub of the friction surface clutch by means of toothing, wherein the hub may be disposed on a shaft of the friction surface clutch. Therefore, a rotational motion of the first tapered element can be transmitted to the shaft. The shaft can then be used as a driven shaft by means of which torque can be transmitted to the air compressor.

In this regard, it may also be advantageous that the first tapered element is axially displaceable along a rotation axis of the first tapered element. Therefore, the force-locked connection and disconnection of the tapered elements can be achieved in a simple manner by means of axial displacement of the first tapered element.

In a particularly preferred embodiment of the invention, an outer side of a sleeve of the first tapered element can form the first friction surface and an inner side of a sleeve of the second tapered element can form the second friction surface.

In addition, the second tapered element can be mounted on a shaft of the friction surface clutch by means of a roller bearing of the friction surface clutch. Spheres, cylinder rollers or needle rollers can be provided as a rolling body of the roller bearing, and can be provided in a liner of the roller bearing. Because of the tapered connection of the tapered elements, the roller bearing can be unloaded in a radial direction, thereby reducing the susceptibility of the roller bearing to idle marks (false brinelling).

In an advantageous variant of the invention the second tapered element can be connected to a drive wheel of the friction surface clutch. Torque can thus for example be transferred directly from an internal combustion engine of the motor vehicle to the second tapered element.

In particular, a gear can be provided as a drive wheel. The number of teeth and/or a diameter of the gear can be adapted to a desired transmission ratio.

The second tapered element can also be screwed onto the drive wheel. In this case the drive wheel can then be disconnected from the second tapered element in a simple manner and thus replaced. Advantageously, the friction surfaces can be made of steel. The wear of the friction surfaces can therefore be significantly reduced.

In addition, an inclination of the friction surfaces with respect to a rotation axis of the tapered elements can be within the range of 5° to 10°. High surface pressures of the friction surfaces on each other can thus be achieved with a small axial force effort, so that a large torque can be transmitted.

According to a structurally advantageous design of the present invention the tapered elements can be integrated into a housing of the friction surface clutch. Therefore, the ingress of dirt or dust into the friction surface clutch can be prevented. The housing may also constitute a receiving space for the actuating element.

The motor vehicle according to the present invention has an air compressor or the like and a friction surface clutch for switching the air compressor. With regard to the advantageous effects of the motor vehicle according to the invention, reference is made to the description of the advantages of the friction surface clutch according to the invention.

Other advantageous embodiments of the motor vehicle result from the description of features of the dependent claims referring back to device claim 1.

In the method according to the invention for actuating a friction surface clutch for use in motor vehicles, in particular for switching an air compressor or the like, a first tapered element of the friction surface clutch having a first friction surface is force-lock connected/disconnected to/from a second tapered element of the friction surface clutch having a second friction surface by means of an actuating element of an actuating device of the friction surface clutch, wherein the tapered elements are force-lock connected in an unactuated operating state of the friction surface clutch, wherein a pressure element of the actuating device coupled to the actuating element engages a lever device of the actuating device interacting with the first tapered element in an actuated operating state of the friction surface clutch in such a way that the force-locked connection is disconnected, wherein the pressure element is guided in a guide part of the first tapered element in a torsion-resistant way relative to the first tapered element prior to reaching a wear limit of the friction surfaces and is engaged with the lever device for disconnecting the force-locked connection, wherein the pressure element is detached from the guide part when the wear limit of the friction surfaces is reached in such a way that the pressure element can no longer engage with the lever device after leaving the guide part, so that the force-locked connection can no longer be disconnected. With regard to the advantageous effects of the method according to the invention, reference is made to the description of the advantages of the friction surface clutch according to the invention.

Further advantageous embodiments of the method result from the description of features of the dependent claims referring back to device claim 1.

The concept of the present invention is not limited to cone clutches, but can of course in particular also be applied to disk clutches or friction disk clutches.

Preferred embodiments of the present invention are described in detail below with reference to the accompanying drawings.

IN THE DRAWINGS

Figure 1:
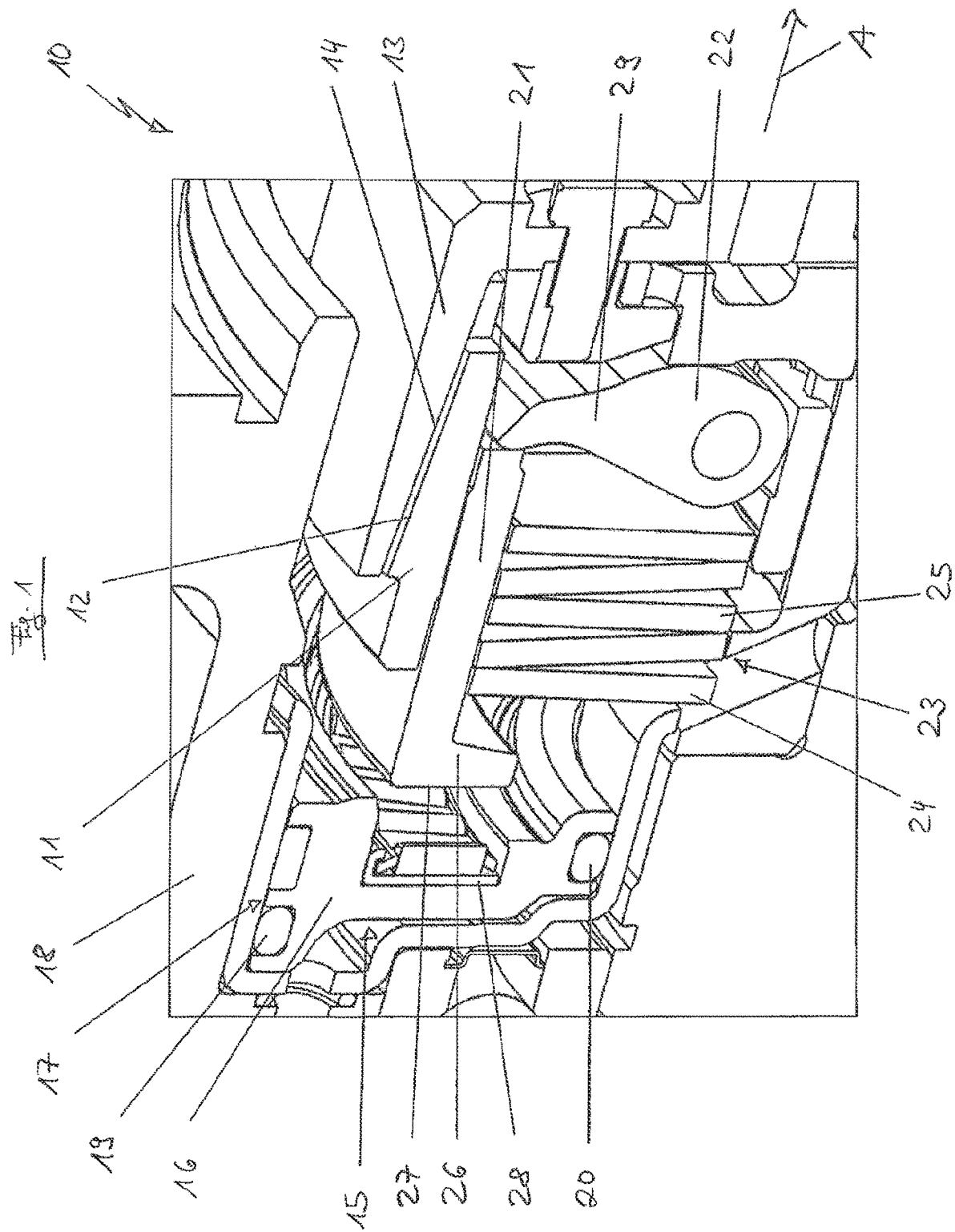
FIG. 1 shows a perspective partial cross-sectional view of a friction surface clutch in an unactuated operating state.

FIG. 1 shows a friction surface clutch 10 in an unactuated operating state of the friction surface clutch 10, wherein the friction surface clutch 10 comprises a first tapered element 11 having a first friction surface 12 and a second tapered element 13 having a second friction surface 14. In the unactuated operating state of the friction surface clutch 10, the tapered elements 11 and 13 or the friction surfaces 12 and 14 are force-locked together. Furthermore, the friction surface clutch 10 has an actuating device 15, which has an actuating element 16, which is in this case constituted by a pneumatically actuatable piston, by means of which the tapered elements 11 and 13 can be disconnected or can be connected by force-locking. The actuating element 16 is supported in a receiving space 17 of a housing 18 of the friction surface clutch 10 so as to be axially displaceable with respect to a rotational axis of the first tapered element 11 via roller bearings 19 and 20 of the actuating device 15. The actuating element 16 is axially displaceable from an initial position to an end position. Furthermore, the actuating device 15 has a spring, not shown here, which moves the actuating element 16 from the end position to the initial position when the friction surface clutch 10 is transferred from the actuated operating state to the unactuated operating state or in the case that the actuating element 16 is no longer being subjected to pressure. The first tapered element 11 is form-fittingly connected to a hub of the friction surface clutch 10, also not shown, by means of toothing not shown herein, wherein the hub is arranged on a shaft of the friction surface clutch 10, also not shown here. Here, the first tapered element 11 can be axially moved along the rotation axis. The shaft itself is supported in the housing 18 of the friction surface clutch 10 by means of a roller bearing not shown here. The second tapered element 13 is supported on the shaft rotation-symmetrically with respect to the rotation axis via a roller bearing (not shown here) of the friction surface clutch 10 and is connected to a drive wheel (not shown here) configured as a gear by means of screws (not shown here). A disk (not shown herein) form-fittingly connected to the shaft secures the second tapered element 13 against axial movement. If the drive wheel is now driven by a drive device not shown here, such as an internal combustion engine, a torque applied by the drive device to the drive wheel or the second tapered element 13 is transmitted to the first tapered element 11 in the unactuated operating state.

Furthermore, the actuating device 15 has a pressure element 21 coupled to the actuating element 16 and a lever device 22 interacting with the first tapered element 11, wherein the pressure element 21 can be engaged with the lever device 22 when the friction surface clutch 10 is actuated or in an actuated operating state of the friction surface clutch 10 in such a way that the force-locked connection can be disconnected. In the unactuated operating state of the friction surface clutch 10, the tapered elements 11 and 13 or the friction surfaces 12 and 14 are force-locked together. If torque is now transmitted by means of the friction surface clutch 10 the tapered elements 11 and 13 perform a rotational movement. The lever device 22 is connected to the first tapered element 11 here, so that the lever device 22 participates in the rotational movement of the tapered elements 11 and 13. The pressure element 21 is further rotationally synchronized with the first tapered element 11 by a form-fitting connection between the pressure element 21 and the first tapered element 11. The pressure element 21 thus also participates in the rotational movement of the tapered elements 11 and 13. However, the actuating element 16 is constructed or arranged in such a way that the same does not participate in the rotational movement of the tapered elements 11 and 13. If the friction surface clutch 10 is now actuated, the pressure element 21 engages with the lever device 22 or is pressed onto the lever device 22. This causes displacement or tilting of the lever device 22 and the first tapered element 11 interacting with the same, which disconnects the force-locked connection.

Furthermore, the actuating device 15 has a spring means 23, which in this case is constituted by two alternately layered disk springs 24 and 25, by means of which the tapered elements 11 and 13 can be pressed together in a force-locked way in the unactuated operating state. In the unactuated operating state, the pressure element 21 which is rotatable relative to the actuating element 16 is not in contact with the actuating element 16. In actuating the friction surface clutch 10, the actuating element 16 is axially displaced with respect to the rotation axis in an axial direction A in the direction of the pressure element 21. During axial movement of the actuating element 16, the actuating element 16 contacts the pressure element 21 in such a way that a radially inwardly extending portion 26 of an axial side 27 of the pressure element 21 abuts precisely in a recess 28 of the actuating element 16. The actuating element 21, which is mechanically coupled to the actuating element 16, then moves likewise during a further axial displacement of the actuating element 16 until the actuating element 16 has reached the end position. In the end position, the pressure element 21 presses against the lever device 22 which is connected to the first tapered element 11 and engaged with the spring means 23. This results in a tilt of the lever device 22, whereby the first tapered element 11 is axially displaced in the direction of the actuating element 16 against the axial direction A with respect to the rotation axis. The force-locked connection between the tapered elements 11 and 13 is therefore disconnected, so that a torque applied to the second tapered element 13 can no longer be transmitted to the first tapered element 11.

A pressure ring is provided as a pressure element 21 and the lever device 22 comprises three clutch release levers 29, of which only one is visible in FIG. 1. The clutch release levers 29 are arranged at uniform intervals around the rotation axis of the first tapered element 11. The pressure element 21 comprises a main body, not shown here, and three pressure sections, also not shown here, which are constructed as circular protrusions projecting from the main body in the axial direction A, also not shown here, wherein the pressure element 21 can be engaged with the clutch release levers 29 via the pressure sections.

Figure 2:
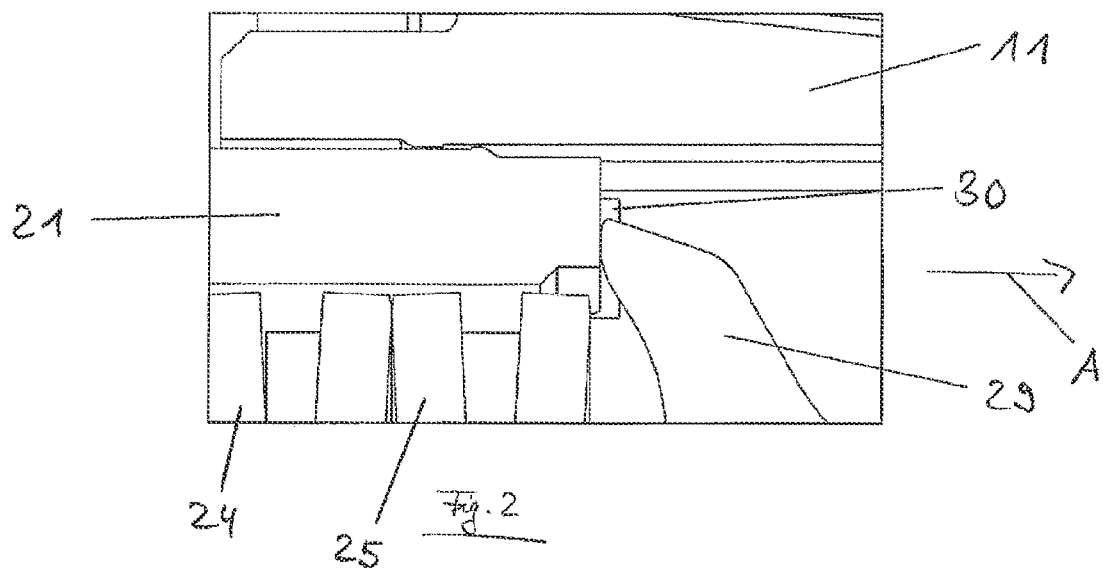
FIG. 2 shows a partial cross-sectional view of a pressure element detached from a guide part.
Figure 3:
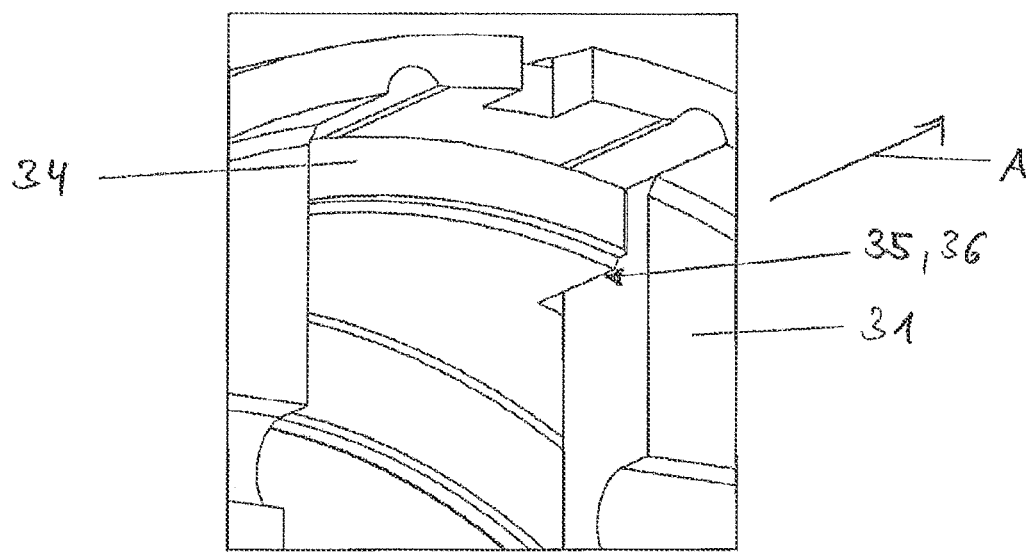
FIG. 3 shows a perspective partial view of a pressure element arrested in a guide part as seen in a reverse axial direction.

When actuating the friction surface clutch 10, the friction surfaces 12 and 14 continuously wear in such a way that the pressure element 21, when reaching a wear limit of the friction surfaces 12 and 14, can be detached from a guide part 30 of the first tapered element 11, in which the pressure element 21 can be guided in a torsional locking manner relative to the first tapered element 11 before reaching the wear limit of the friction surfaces 12 and 14, and is capable of engaging with the lever device 22 in order to disconnect the force-locked connection, such that the pressure element 21 can no longer be engaged with the lever device 22 after leaving the guide part 30. Therefore, the force-locked connection can no longer be disconnected when the wear limit is reached. This is illustrated in FIG. 2. In particular, it can be seen for this purpose that the pressure element 21 is detached from the guide part 30. The pressure element 21 can thus be rotated relative to the first tapered element 11 due to rotational acceleration.

An inspection of FIGS. 3 to 10 shows an advantageous embodiment of a first tapered element 31 and a pressure element 32. The friction surface clutch 10 shown in FIG. 1 can comprise the first tapered element 31 and/or the pressure element 32.

A pressure ring is provided as a pressure element 32, wherein the pressure element 32 comprises a main body 33 and three pressure sections 34, of which only one is shown here, wherein the pressure sections 34 are constructed as circular protrusions projecting from the main body 33 in the axial direction A, wherein the pressure element 32 can be engaged with clutch release levers (not shown here) via the pressure sections 34. The pressure element 32 constitutes the pressure sections 34 here.

In addition, the first tapered element 31 has three passages 36 at least contributing toward forming a guide part 35 of the first tapered element 31, in which the pressure sections 34 at least partially engage in the unactuated operating state prior to reaching the wear limit of friction surfaces (not shown here), so that the pressure sections 34 can be held in the passages 36 with respect to the first tapered element 31 in a torsion-resistant way, wherein the pressure sections 34 can pass through the passages 36 in the actuated operating state in such a way that the pressure sections 34 can engage with the clutch release levers (not shown here) arranged behind the passages 36 as viewed in the axial direction A. It is clear from FIG. 3 how a pressure section 34 at least partially engages a passage 36 or is arrested in the guide part 35.

Figure 4:
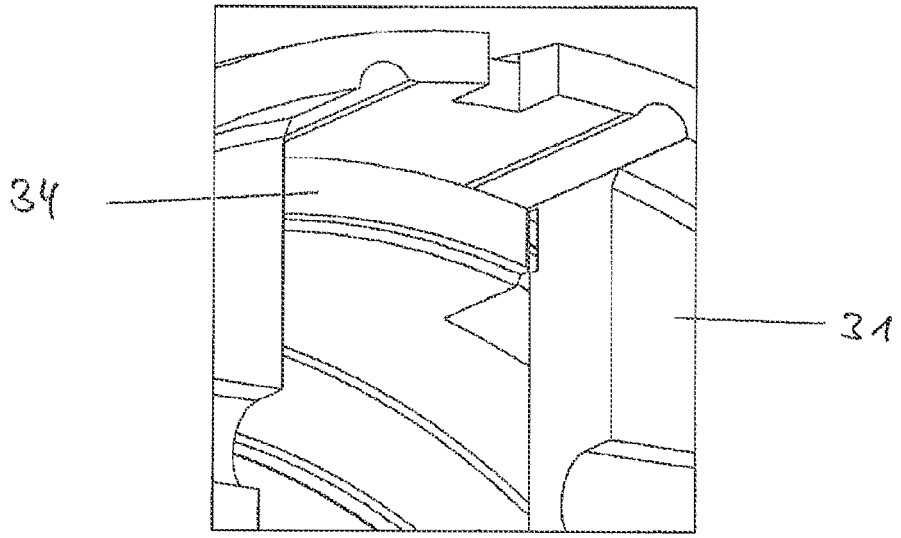
FIG. 4 shows a perspective partial view of the pressure element detached from the guide part as viewed in the reverse axial direction.
Figure 7:
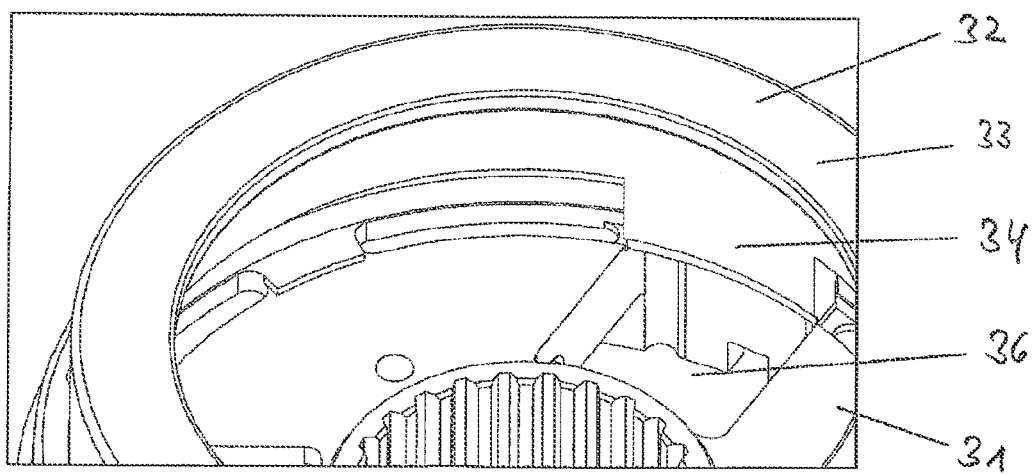
FIG. 7 shows a perspective partial view of the pressure element detached from the guide part as viewed in the axial direction.

In the case of continued wear of the friction surfaces, the first tapered element 31 is moved away from the pressure element 32 in the axial direction A, so that the pressure sections 34 no longer engage in the passages 36 when the wear limit of the friction surfaces is reached in the unactuated operating state, whereby the pressure sections 34 leave the guide part 35 and are detached from the guide part 35 as shown in FIGS. 4 and 7.

Figure 5:
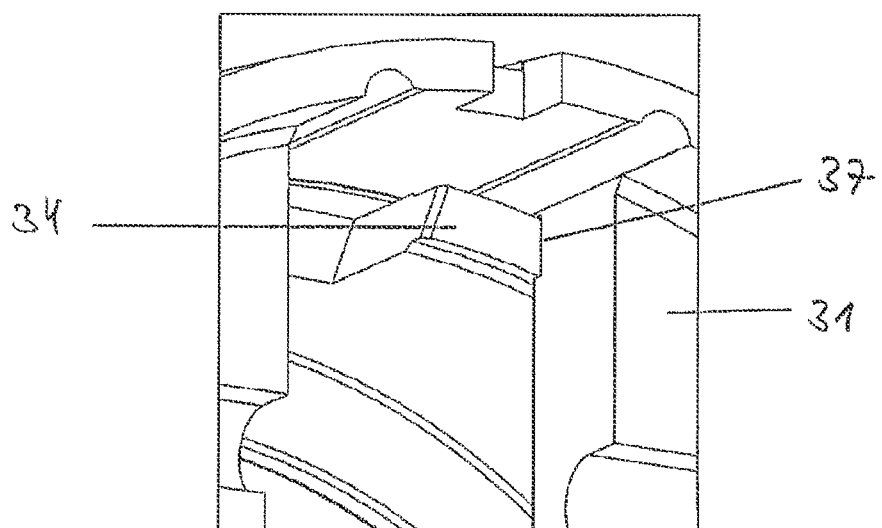
FIG. 5 shows a perspective partial view of the pressure element detached from the guide part and twisted with respect to a first tapered element as viewed in the reverse axial direction.
Figure 8:
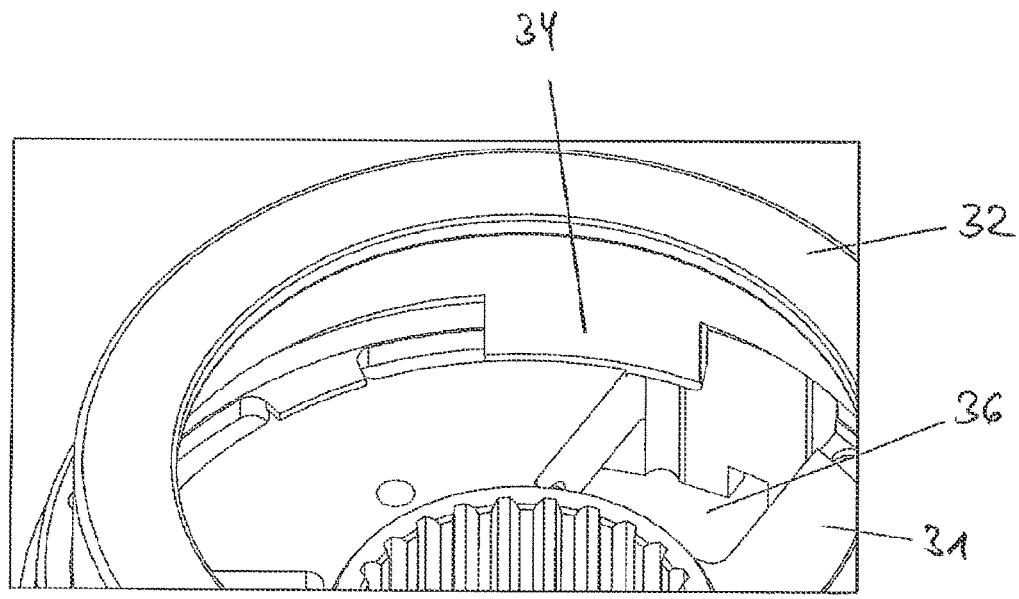
FIG. 8 shows a perspective partial view of the pressure element detached from the guide part and twisted with respect to the first tapered element as viewed in the axial direction.

After leaving the guide part 35 the pressure sections 34 rotate as can be seen in FIGS. 5 and 8 relative to the first tapered element 31 at a rotation angle not shown here, so that the pressure sections 34 are no longer able to press against an inner surface 37 of the first tapered element 31 at least partially in alignment with the passages 36 in the actuated operating state. In particular due to rotational acceleration applied to the pressure element 32 in particular when a friction surface clutch (not shown here) which can comprise the first tapered element 31 and the pressure element 32 is actuated, the pressure sections 34 then rotate relative to the passages 36 to such an extent that the pressure sections 34 are no longer aligned with the passages 36, so that the pressure sections 34 are no longer engaged with or pass through the passages 36 when actuating the friction surface clutch, but instead press at least partly on the inner surface 37 of the first tapered element 31 or come to lie against the same. Since the pressure sections 34 are no longer pressed against the clutch release levers, but against the inner surface 37, the force-locked connection is no longer disconnectable.

Figure 6:
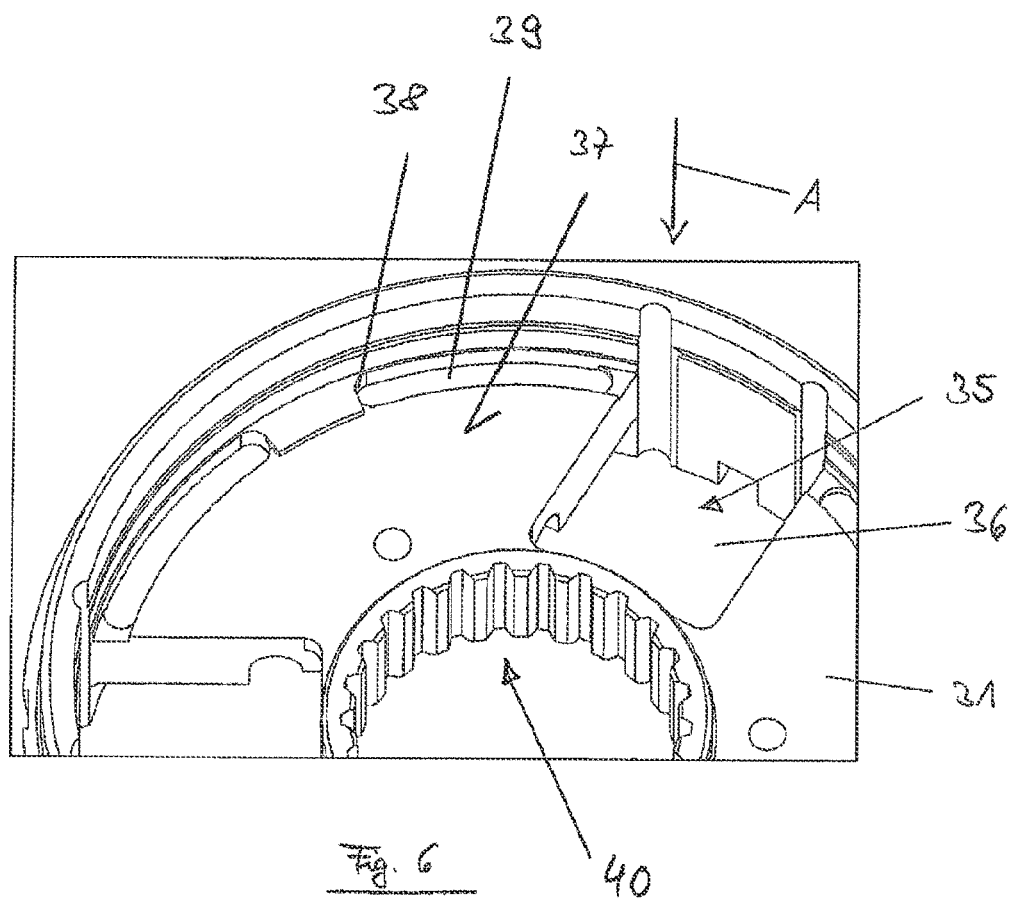
FIG. 6 shows a perspective partial view of the first tapered element as viewed in the axial direction.
Figure 9:
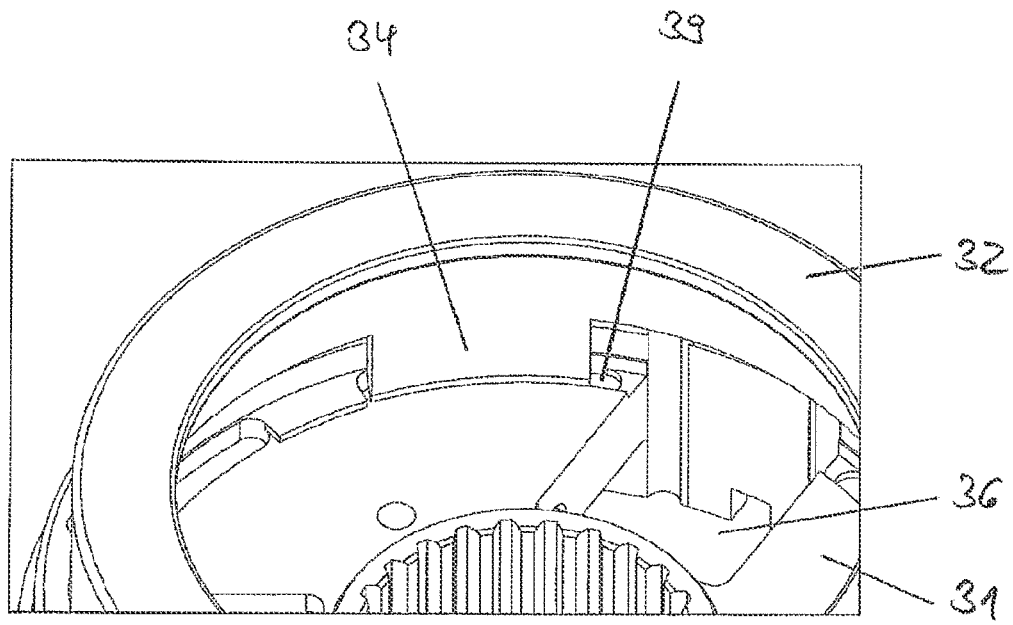
FIG. 9 shows a perspective partial view of the pressure element arrested in a receiving recess as viewed in the axial direction.
Figure 10:
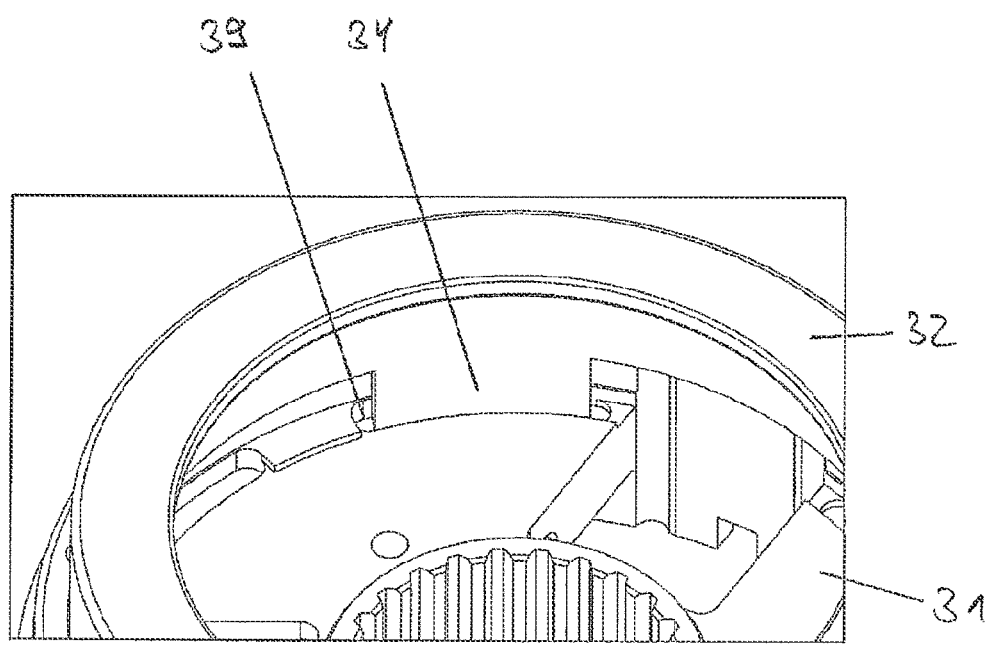
FIG. 10 shows a perspective partial view of the pressure element arrested in the receiving recess as viewed in the axial direction.

Furthermore, the first tapered element 31, as is particularly clear in FIGS. 6, 9 and 10, has stops 38 limiting the rotation angle and receiving recesses 39 into which the pressure sections 34 arrest after completely leaving the guide part 35.

FIGS. 6 to 10 show that the first tapered element 31 has toothing 40, by means of which the first tapered element 31 can be form-fittingly connected to a hub (not shown here) of the friction surface clutch, wherein the hub can be arranged on a shaft (also not shown here) of the friction surface clutch.

An inspection of FIGS. 11 to 14 shows a friction surface clutch 41. FIGS. 11 to 14 show a first tapered element 42, a second tapered element 43, a clutch release levers 44, a guide part 45 and a pressure element 46 having a pressure section 47.

Figure 11:
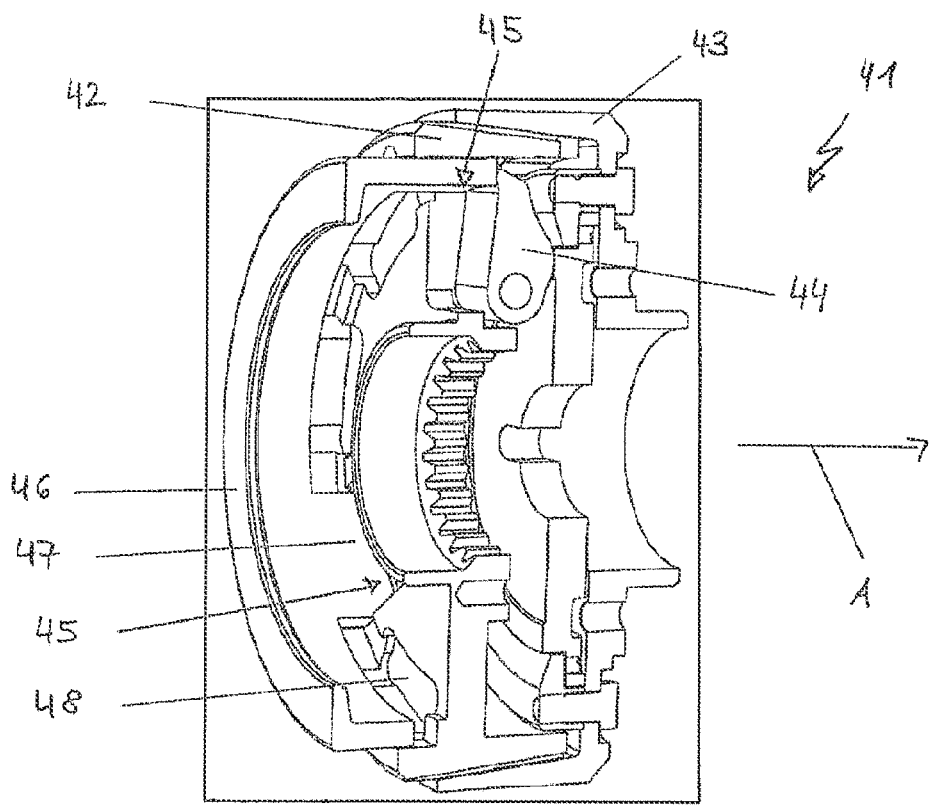
FIG. 11 shows a perspective partial cross-sectional view of a friction surface clutch prior to reaching a wear limit of friction surfaces in an unactuated operating state of the friction surface clutch.
Figure 12:
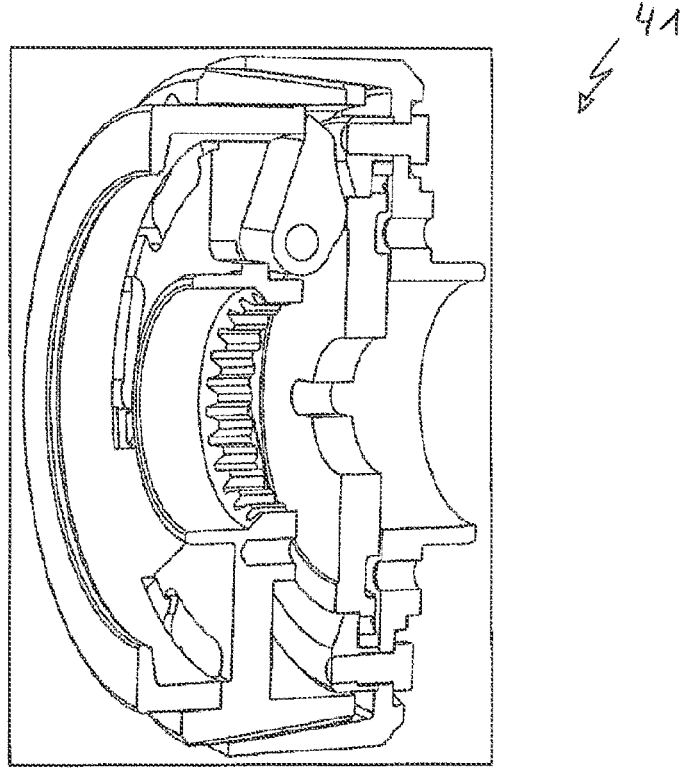
FIG. 12 shows a perspective partial cross-sectional view of the friction surface clutch prior to reaching a wear limit of friction surfaces in an actuated operating state of the friction surface clutch.

FIGS. 11 and 12 show the friction surface clutch 41 in an unactuated or actuated operating state of the friction surface clutch 41 prior to friction surfaces not shown here reaching a wear limit. The pressure section 47 is arrested in the guide part 45 in FIG. 11.

Figure 13:
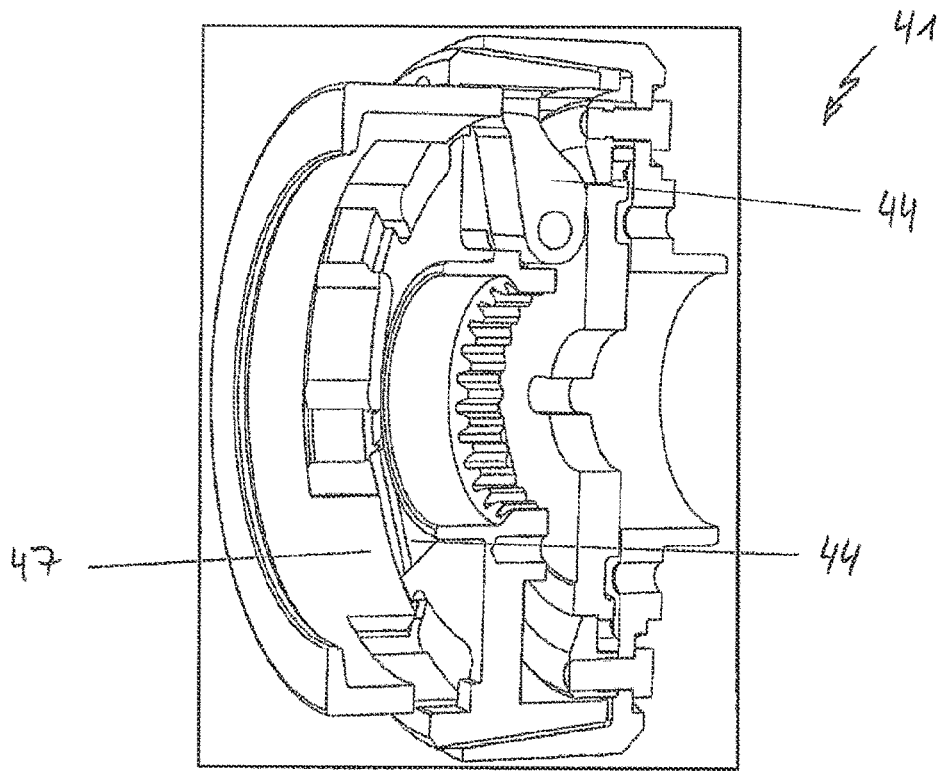
FIG. 13 shows a perspective partial cross-sectional view of the friction surface clutch having a pressure element detached from a guide part.
Figure 14:
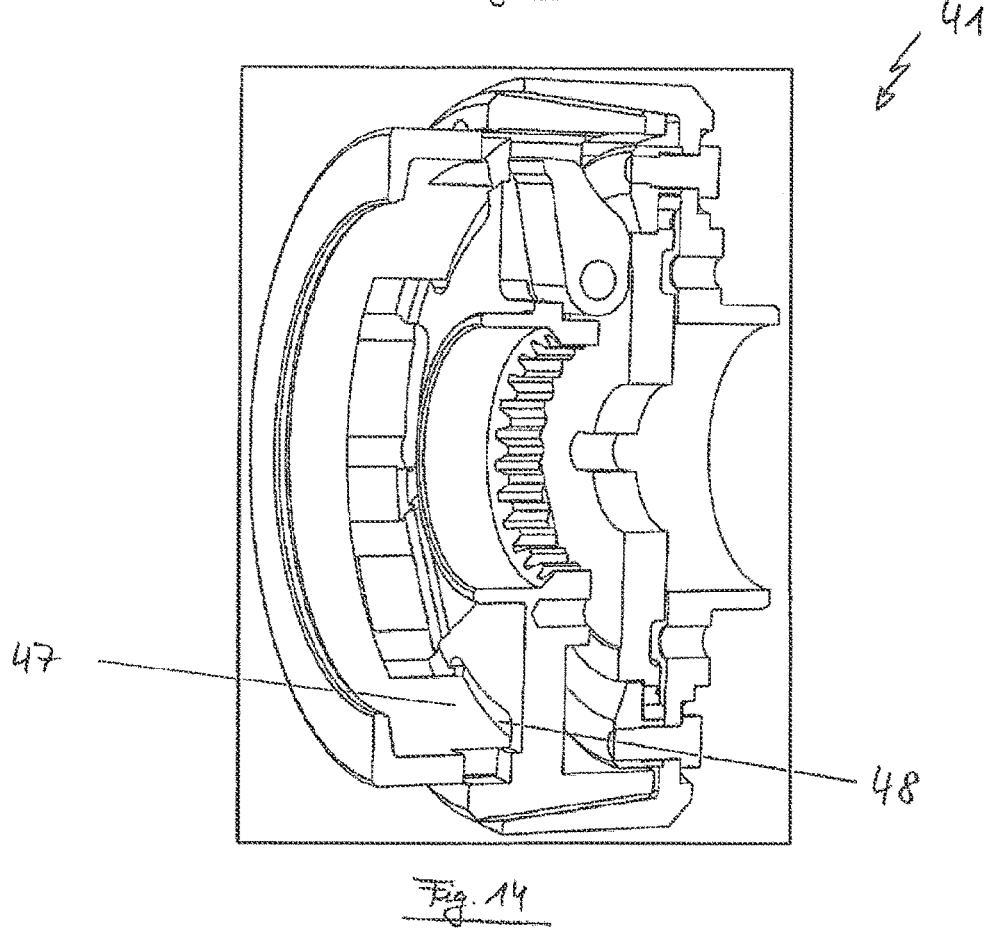
FIG. 14 shows a perspective partial cross-sectional view of the friction surface clutch having the pressure element detached from the guide part and rotated relative to a first tapered element.

FIGS. 13 and 14 show the friction surface clutch 41 after reaching the wear limit of the friction surfaces. The pressure section 47 is detached from the guide part 45 and has rotated relative to the first tapered element 42. In FIG. 14, the pressure section 43 has arrested into a receiving recess 48.

Figure 15:
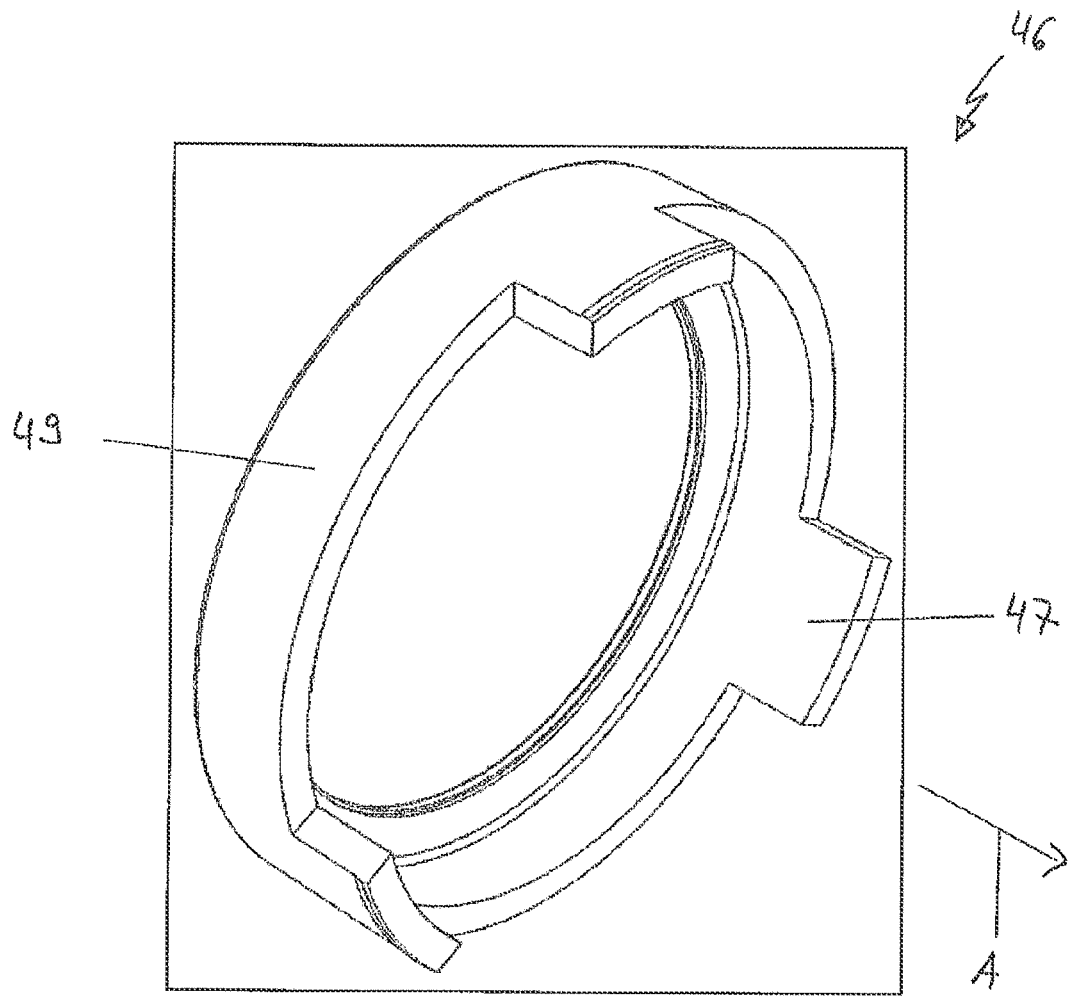
FIG. 15 shows a perspective view of the pressure element.

Finally, it is clear from FIG. 15 that the pressure element 46 configured as a pressure ring has a main body 49 and three pressure sections 47.

LIST OF REFERENCE NUMERALS

10 Friction surface clutch
11 First tapered element
12 First friction surface
13 Second tapered element
14 Second friction surface
15 Actuating device
16 Actuating element
17 Receiving space
18 Housing
19 Roller bearing
20 Roller bearing
21 Pressure element
22 Lever device
23 Spring means
24 Disk spring
25 Disk spring
26 Portion
27 Axial side
28 Recess
29 Clutch release lever
30 Guide part
31 First tapered element
32 Pressure element
33 Main body
34 Pressure section
35 Guide part
36 Passage
37 Inner surface
38 Stop
39 Receiving recess
40 Toothing
41 Friction surface clutch
42 First tapered element
43 Second tapered element
44 Clutch release lever
45 Guide part
46 Pressure element
47 Pressure section
48 Receiving recess
49 Main body
A Axial direction

The invention claimed is:

1. A friction surface clutch (10, 41) for use in motor vehicles, wherein the friction surface clutch comprises a first tapered element (11, 31, 42) having a first friction surface (12) and a second tapered element (13, 43) having a second friction surface (14), wherein the friction surface clutch has an actuating device (15) having an actuating element (16) for force-locked connection and disconnection of the tapered elements, wherein the tapered elements are in force-locked connection in an unactuated operating state of the friction surface clutch, and wherein the actuating device comprises a pressure element (21, 32, 46) coupled to the actuating element and a lever device (22) interacting with the first tapered element, wherein the pressure element can be engaged with the lever device in an actuated operating state of the friction surface clutch, so that the force-locked connection can be disconnected, wherein the first tapered element has a guide part (30, 35, 45), in which the pressure element can be guided in a torsion-resistant way relative to the first tapered element prior to reaching a wear limit of the friction surfaces and can be engaged with the lever device in order to disconnect the force-locked connection, wherein the pressure element can be detached from the guide part when the wear limit of the friction surfaces is reached such that the pressure element can no longer engage with the lever device after leaving the guide part, so that the force-locked connection can no longer be disconnected.

2. The friction surface clutch according to claim 1, wherein a pressure ring is provided as the pressure element (21, 32, 46) and the lever device (22) comprises at least two, clutch release levers (29, 44), wherein the pressure element comprises a main body (33, 49) and a number of pressure sections (34, 47) corresponding to the at least two clutch release levers, which pressure sections are constructed as circular protrusions projecting from the main body in an axial direction (A), wherein the pressure element can be engaged with the clutch release levers via the pressure sections.

3. The friction surface clutch according to claim 2, wherein the first tapered element (11, 31, 42) has a number of passages (36) corresponding to the number of pressure sections (34, 47) and at least contributing toward forming the guide part (30, 35, 45), in which the pressure sections are at least partially engaged with the passages in the unactuated operating state before reaching the wear limit of the friction surfaces (12, 14), so that the pressure sections can be held in the passages with respect to the first tapered element in the torsion-resistant way, wherein the pressure sections can pass through the passages in the actuated operating state in such a way that the pressure sections can engage with the clutch release levers (29, 44) arranged behind the passages as viewed in the axial direction (A).

4. The friction surface clutch according to claim 3, wherein the first tapered element (11, 31, 42) is capable of moving away from the pressure element (21, 32, 46) in the axial direction (A) while the friction surfaces (12, 14) continue to wear, so that the pressure sections (34, 47) no longer engage in the passages (36) when the wear limit of the friction surfaces is reached in the unactuated operating state, whereby the pressure sections can be detached from the guide part (30, 35, 45).

5. The friction surface clutch according to claim 4, wherein the pressure sections (34, 47) are rotatable relative to the first tapered element (11, 31, 42) after leaving the guide part (30, 35, 45), so that the pressure sections are no longer able to press against an inner surface (37) of the first tapered element at least partially in alignment with the passages (36) in the actuated operating state.

6. The friction surface clutch according to claim 5, wherein the first tapered element (11, 31, 42) has a stop (38) limiting a rotation angle and at least one receiving recess (39, 48), into which at least one of the pressure sections (34, 47) can be arrested after fully leaving the guide part (30, 35, 45).

7. The friction surface clutch according to claim 1, wherein the actuating element (16) can be actuated pneumatically, hydraulically, or electromagnetically.

8. The friction surface clutch according to claim 1, wherein the actuating element (16) is configured as a piston.

9. The friction surface clutch according to claim 1, wherein the actuating element (16) is spring-resettable.

10. The friction surface clutch according to claim 1, wherein the actuating device (15) has a spring means (23) by means of which the tapered elements (11, 13, 31, 42, 43) can be pressed together in the force-locked connection in the unactuated operating state of the friction surface clutch (10, 41).

11. The friction surface clutch according to claim 1, wherein the first tapered element (11, 31, 42) is form-fittingly connected to a hub of the friction surface clutch (10, 41) by means of toothing (40), wherein the hub is arranged on a shaft of the friction surface clutch.

12. The friction surface clutch according to claim 1, wherein the first tapered element (11, 31, 42) is axially displaceable along a rotation axis of the first tapered element.

13. The friction surface clutch according to claim 1, wherein an outer side of a sleeve of the first tapered element (11, 31, 42) forms the first friction surface (12), and an inner side of a sleeve of the second tapered element (13, 43) forms the second friction surface (14).

14. The friction surface clutch according to claim 1, wherein the second tapered element (13, 43) is mounted on a shaft of the friction surface clutch by means of a roller bearing of the friction surface clutch (10, 41).

15. The friction surface clutch according to claim 1, wherein the second tapered element (13, 43) is connected to a drive wheel of the friction surface clutch (10, 41).

16. The friction surface clutch according to claim 1, wherein the friction surfaces (12, 14) are made of steel.

17. The friction surface clutch according to claim 1, wherein an inclination of the friction surfaces (12, 14) with respect to a rotation axis of the tapered elements (11, 13, 31, 42, 43) is within a range of 5° to 10°.

18. The friction surface clutch according to claim 1, wherein the tapered elements (11, 13, 31, 42, 43) are integrated into a housing (18) of the friction surface clutch (10, 41).

19. A motor vehicle having an air compressor and the friction surface clutch (10, 41) according to claim 1, for switching the air compressor.

20. A method for actuating a friction surface clutch (10, 41) for use in motor vehicles, wherein a first tapered element (11, 31, 42) of the friction surface clutch having a first friction surface (12) is force-lock connected/disconnected to/from a second tapered element (13, 43) of the friction surface clutch having a second friction surface (14) by means of an actuating element (16) of an actuating device (15) of the friction surface clutch, wherein the tapered elements are force-lock connected in an unactuated operating state of the friction surface clutch, and wherein a pressure element (21, 32, 46) of the actuating device coupled to the actuating element engages a lever device (22) of the actuating device interacting with the first tapered element in an actuated operating state of the friction surface clutch in such a way that the force-locked connection is disconnected, wherein the pressure element is guided in a guide part (30, 35, 45) of the first tapered element in a torsion-resistant way relative to the first tapered element prior to reaching a wear limit of the friction surfaces and is engaged with the lever device for disconnecting the force-locked connection, wherein the pressure element is detached from the guide part when the wear limit of the friction surfaces is reached in such a way that the pressure element can no longer engage with the lever device after leaving the guide part, so that the force-locked connection can no longer be disconnected.

* * * * *